US008812229B2

(12) United States Patent
Rosswog et al.

(10) Patent No.: US 8,812,229 B2
(45) Date of Patent: Aug. 19, 2014

(54) ROUTE RE-PLANNING USING ENEMY FORCE LETHALITY PROJECTION (71) Applicant: Lockheed Martin Corporation, Bethesda, MD (US)

(72) Inventors: James C. Rosswog, Endicott, NY (US); Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/048,176

(22) Filed: Oct. 8, 2013

(65) Prior Publication Data

US 2014/0207366 A1  Jul. 24, 2014

Related U.S. Application Data (62) Division of application No. 13/419,852, filed on Mar. 14, 2012, now Pat. No. 8,566,027.

(51) Int. Cl.
*G01C 21/00* (2006.01)
*G01S 13/00* (2006.01)

(52) U.S. Cl.
USPC ............................................ 701/411; 342/63

(58) Field of Classification Search
USPC .................. 701/400–423; 342/45, 52, 62; 340/425.5, 988, 989; 244/3.15, 3.1–3.3
See application file for complete search history.

(56) References Cited

U.S. PATENT DOCUMENTS

| 6,182,007 | B1 | 1/2001 | Szczerba |
| 6,672,534 | B2 | 1/2004 | Harding et al. |
| 6,725,152 | B2 | 4/2004 | Moitra et al. |
| 6,997,097 | B2 | 2/2006 | Harding |
| 7,043,344 | B2 | 5/2006 | Kotzeve et al. |
| 7,194,353 | B1 * | 3/2007 | Baldwin et al. ............... 701/528 |
| 7,236,861 | B2 | 6/2007 | Paradis et al. |
| 7,693,653 | B2 | 4/2010 | Hussain et al. |
| 7,755,011 | B2 | 7/2010 | Lam et al. |
| 7,769,502 | B2 | 8/2010 | Herman |
| 7,869,943 | B1 * | 1/2011 | Simon ........................... 701/436 |
| 2004/0007121 | A1 * | 1/2004 | Graves et al. .................. 89/1.11 |
| 2009/0125225 | A1 | 5/2009 | Hussain et al. |
| 2010/0010793 | A1 * | 1/2010 | Herman ........................... 703/8 |
| 2010/0145552 | A1 * | 6/2010 | Herman et al. .................... 701/3 |
| 2011/0098914 | A1 | 4/2011 | Milbert et al. |
| 2013/0245931 | A1 | 9/2013 | Rosswog et al. |

* cited by examiner

*Primary Examiner* — Muhammad Shafi (74) *Attorney, Agent, or Firm* — Miles & Stockbridge P.C.; James T. Carmichael (57) ABSTRACT A method, system and computer readable media for route re-planning including generating enemy force movement predictions to be used during mission planning. During a mission, enemy force movements can be compared to the predictions. By using enemy force movement predictions for an initial comparison, the enemy force movements may only need to be compared to the own force mission plan if the enemy forces deviate from the predictions. When enemy force movement deviates from the predictions, new enemy force movement predictions can be generated. The new enemy force movement predictions can then be compared to the own force mission plan to determine if a route re-plan is needed. The route can be re-planned to determine a route that reduces or eliminates the chance of a lethal encounter with an enemy or threat.

14 Claims, 10 Drawing Sheets

ROUTE RE-PLANNING USING ENEMY FORCE LETHALITY PROJECTION

Embodiments of the present invention relate generally to methods, systems and computer-readable media for route planning, more specifically, to methods, systems and computer readable media for route re-planning using enemy force lethality projection.

During execution of a mission, such as a military operation, enemy or threat force movements may need to be monitored to ensure that the enemy forces do not pose a threat to own or friendly forces. The comparison of enemy (or threat) movements to the own force mission plan can be time consuming and computationally intensive. The present invention was conceived in light of the aforementioned problem, among other things.

In an embodiment, enemy force movement predictions can be generated and used during mission planning. During a mission, enemy force movements can be compared to the predictions. By using enemy force movement predictions for an initial comparison, the enemy force movements may only need to be compared to the own force mission plan if the enemy forces deviate from the predictions.

When enemy force movement deviates from the predictions, new enemy force movement predictions can be generated taking into account factors such as threat movement capabilities, weapon range, weapon lethality and tracking, lock-on and firing characteristics. The new enemy force movement predictions can then be compared to the own force mission plan to determine if a route re-plan is needed. A route re-plan may be needed, for example, when the new enemy movement predictions indicate an enemy threat area of influence could be potentially harmful or lethal to the own forces. In such cases, the route can be re-planned taking into account threat characteristics, such as speed, weapon range and weapon lethality to determine a route that reduces or eliminates the chance of a lethal encounter with an enemy or threat.

DETAILED DESCRIPTION

Figure 1:
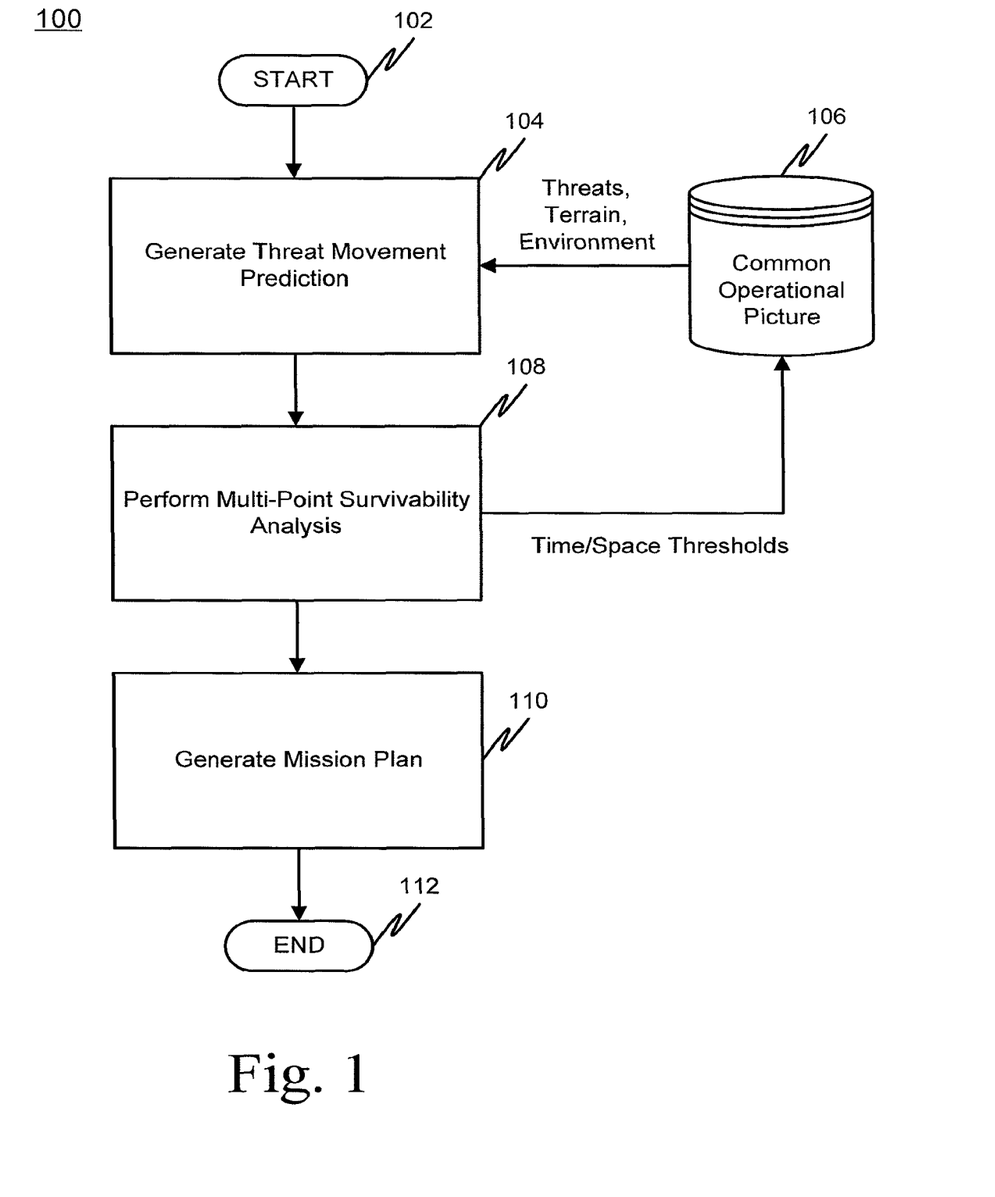
FIG. 1 is a chart showing an exemplary route planning method in accordance with the present disclosure.

FIG. 1 is a chart showing an exemplary route planning method in accordance with the present disclosure. In particular, a method 100 starts at 102 and continues to 104.

At 104, a prediction of threat movement is generated. The prediction is based on information about threats from a common operational picture (COP) database 106, for example. The common operation picture database 106 can include relevant operational information, such as position and capability of own troops, position and capability of enemy troops, and position and status of important infrastructure such as bridges, roads. In general, the COP database 106 can provide information regarding threats, terrain, environment and the like. The common operation picture database 106 can be shared by more than one command to facilitate collaborative planning and assists various entities within a force to achieve situational awareness.

A position and one or more effective ranges for one or more threats can be determined. One or more regions in which the threats are expected to be located can also be defined. For example, a current position, velocity, and direction of travel for each threat can be provided by the COP database 106 or by sensor systems. From these parameters, and known geographical details (e.g., road paths, obstructing terrain, etc.), a path of travel for the threats can be predicted. This prediction, coupled with the known velocity or movement capabilities of the threats, a distribution of possible locations of a given threat can be predicted at each representative time associated a mission. Each threat can be represented by multiple zones, with each zone representing a given range of likelihood that the threat is present within that zone at that time. Processing continues to 108.

At 108, a multi-point survivability analysis is performed using the enemy movement predictions generated at 106. The multi-point survivability analysis can take into account factors such as distance from own force or vehicle to each threat, and capability and lethality of each threat. The survivability can be determined for sub-regions or cells within a geographic area surrounding a planned mission operating area. A cost or risk can be assigned to each sub-region or cell in the geographic area.

Also, time/space threshold can be generated using the threat movement predictions. These time/space thresholds can include thresholds that, if the enemy force movements exceed, a route re-plan may be needed. The time/space thresholds can be based on the movement capabilities of a threat and/or weapon range and lethality. The time/space thresholds can be stored in the COP database 106. Processing continues to 110.

At 110, a mission plan is generated using the time/space thresholds as input. A mission plan can be generated that reduces or minimizes the potential for a lethal engagement by the enemy forces. The mission plan can include a route and timing information for executing a mission. The mission plan can be stored in the COP database 106 and/or transmitted to other systems or vehicles. Processing continues to 112, where processing ends.

Figure 2:
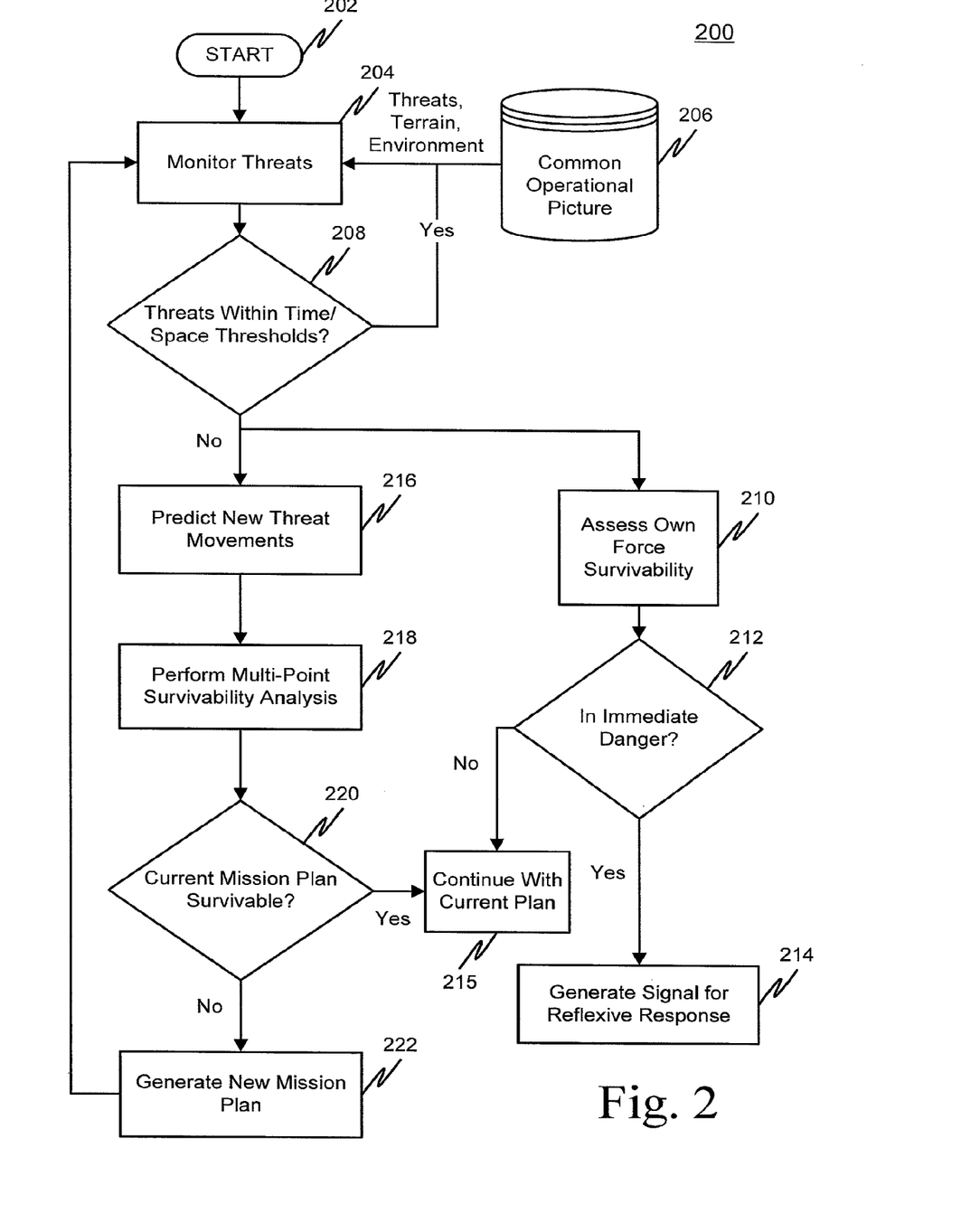
FIG. 2 is a chart showing an exemplary route re-planning method in accordance with the present disclosure.

FIG. 2 is a chart showing an exemplary route re-planning method in accordance with the present disclosure. Processing beings at 202 and continues to 204.

At 204, threat locations are monitored. Threat locations can be determined from sensor systems or from a common operational picture (COP) database 206. The COP database can supply information regarding threats, terrain and environment. Further, threat data (e.g., location, capabilities, or the like) or updates to threat location data may be received wirelessly at a vehicle equipped with an route replanning embodiment from a location remote from the vehicle during execution of the original mission plan Processing continues to 208.

At 208, the threat locations are compared with the time/space thresholds to determine whether the threats are within the thresholds or have exceeded the thresholds. If the threats are within the thresholds, processing returns to 204. If the position of one or more threats exceeds a time/space threshold, processing continues to 210.

At 210, own force survivability is assessed based on the threat locations. Processing continues to 212.

At 212, it is determined whether the own force is in immediate danger. If the own force is in immediate danger, processing continues to 214. If the own force is not in immediate danger, processing continues to 215 where the mission continues according to the current plan.

At 214, a signal is generated to indicate that a reflexive response is needed due to immediate danger. The signal can be in the form of a message sent to another system or a warning or indication on a vehicle display. Processing continues to 216

At 216, new threat movement predictions are generated based on the position exceeding the threshold. The movement predictions can be generated in a manner similar to that discussed above regarding 104. Processing continues to 218.

AT 218, a multi-point survivability analysis is performed using the new threat movement predictions as input. The multi-point survivability analysis can be performed in a manner similar to that discussed above regarding 108. Processing continues to 220.

At 220, it is determined whether the current (i.e., not re-planned route) mission plan is survivable based on the multi-point survivability analysis performed at 218. If the current mission is survivable, processing continues to 215 where the mission continues according to the current plan. If the current mission plan is not survivable, processing continues to 222.

At 222, a new mission plan is generated having a route that is re-planned based on the new threat movement predictions and the multi-point survivability analysis. The new mission plan can be stored in the COP database 206 and/or transmitted to other computer systems or vehicles. Processing continues to 204.

Figure 3:
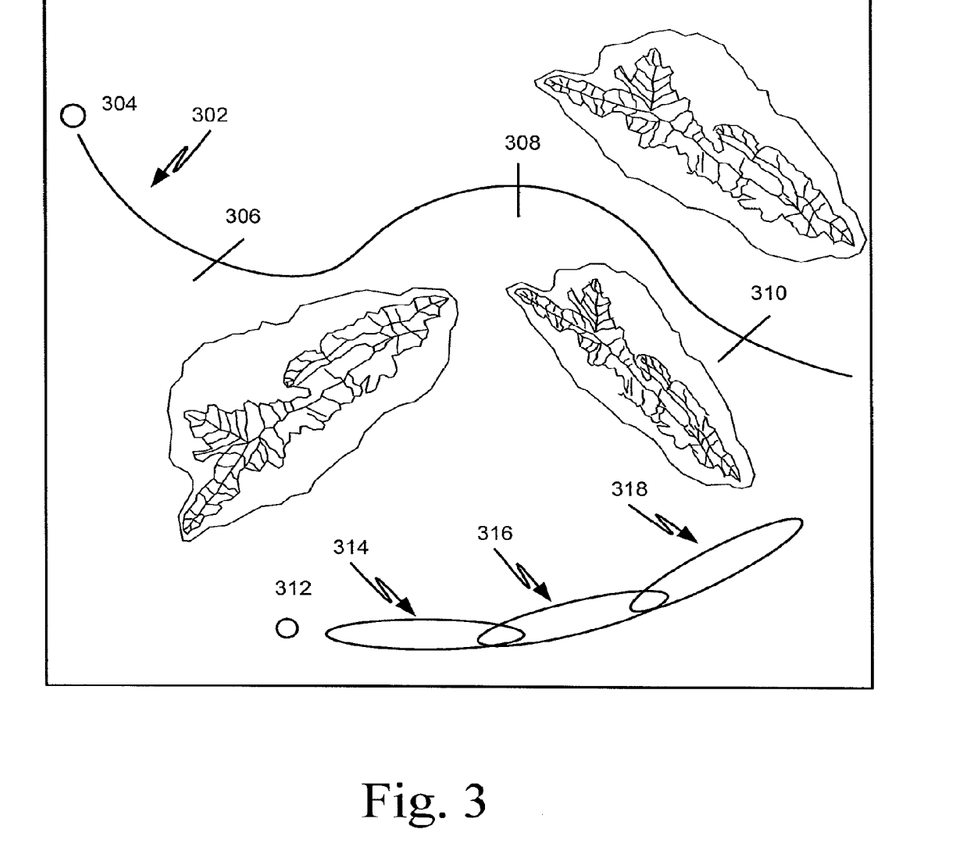
FIG. 3 is a diagram of an exemplary mission plan at time T0 in accordance with the present disclosure.

FIG. 3 is a diagram of an exemplary mission plan at time T0 in accordance with the present disclosure. In particular, an own force route 302 includes a current own force position 304 and positions at time points T0 (306), T1 (308) and T3 (310). The diagram also includes a current enemy force location 312, and a time/space threshold for T1 (314), T2 (316) and T3 (318).

Figure 4:
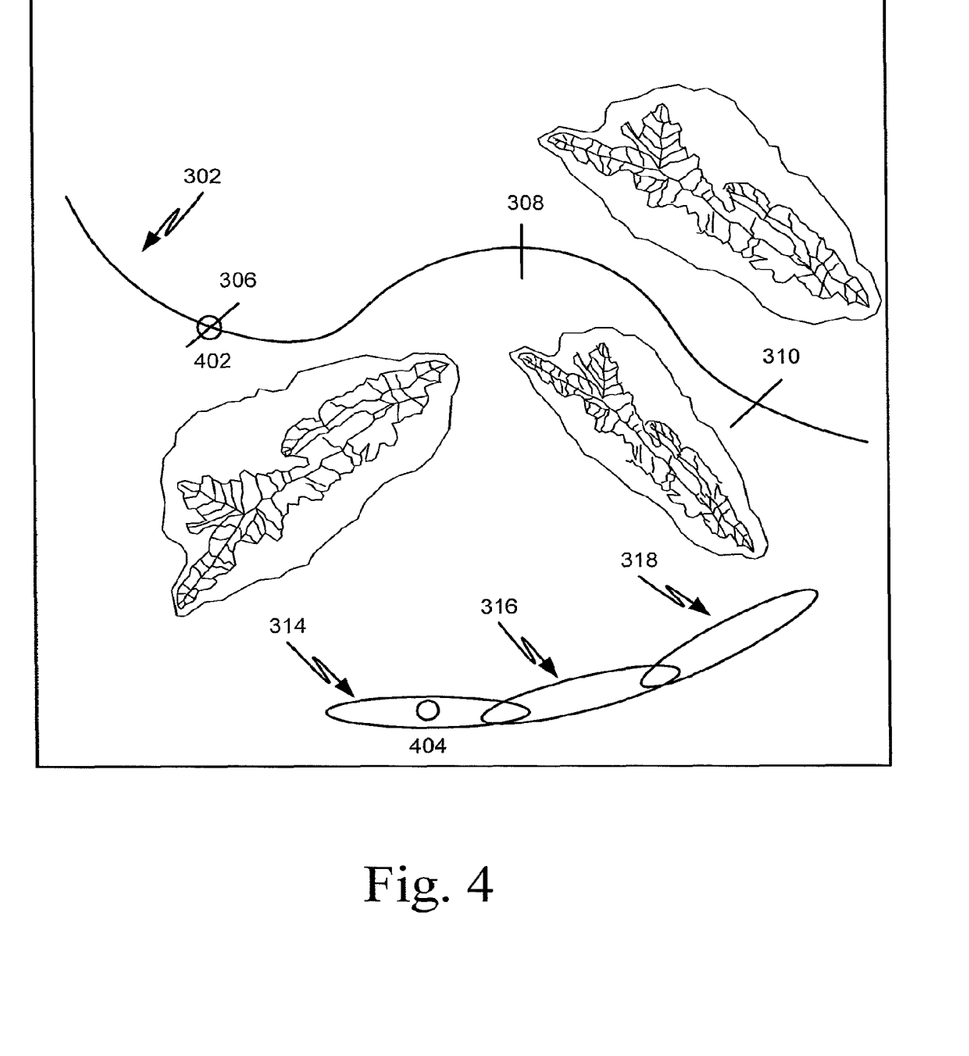
FIG. 4 is a diagram of an exemplary mission at time T1.

FIG. 4 is a diagram of an exemplary mission at time T1. At time T1, own forces 402 are at 306 on the route 302. The enemy force 404 has moved within the threshold 314 for T1.

Figure 5:
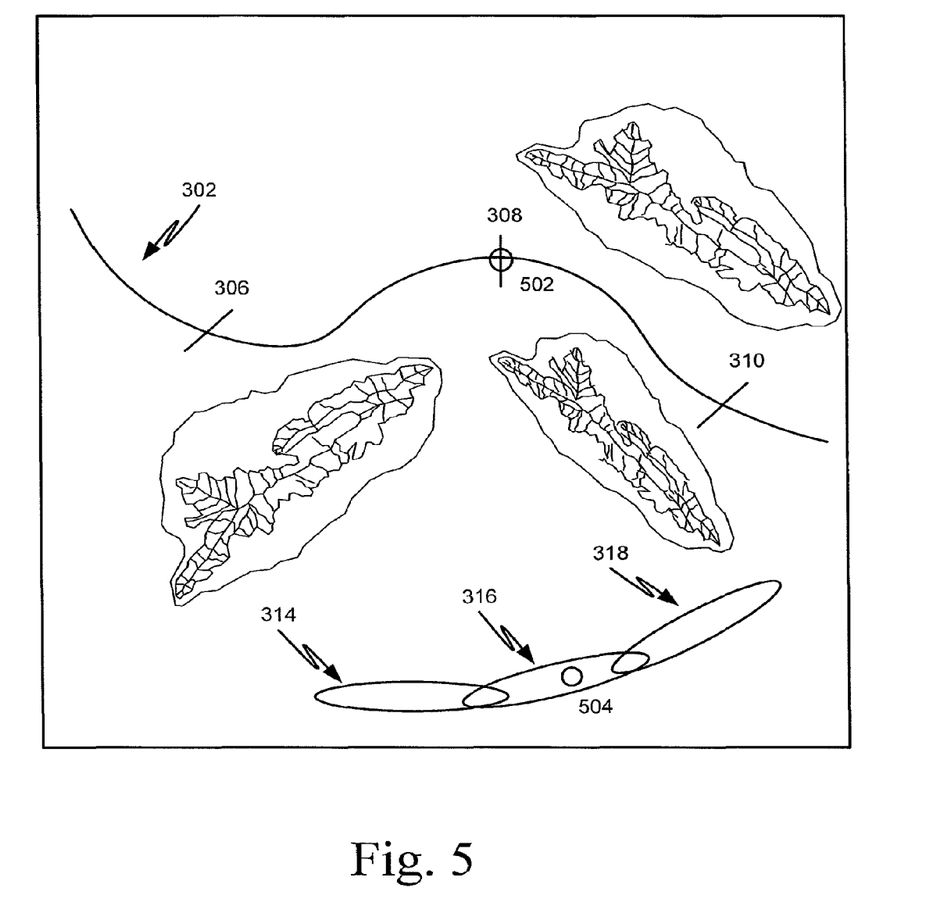
FIG. 5 is a diagram of an exemplary mission at time T2.

FIG. 5 is a diagram of an exemplary mission at time T2. At time T2, own forces 502 have moved to location 308 on route 302. The enemy force 504 has moved within threshold 316 for time T2.

Figure 6:
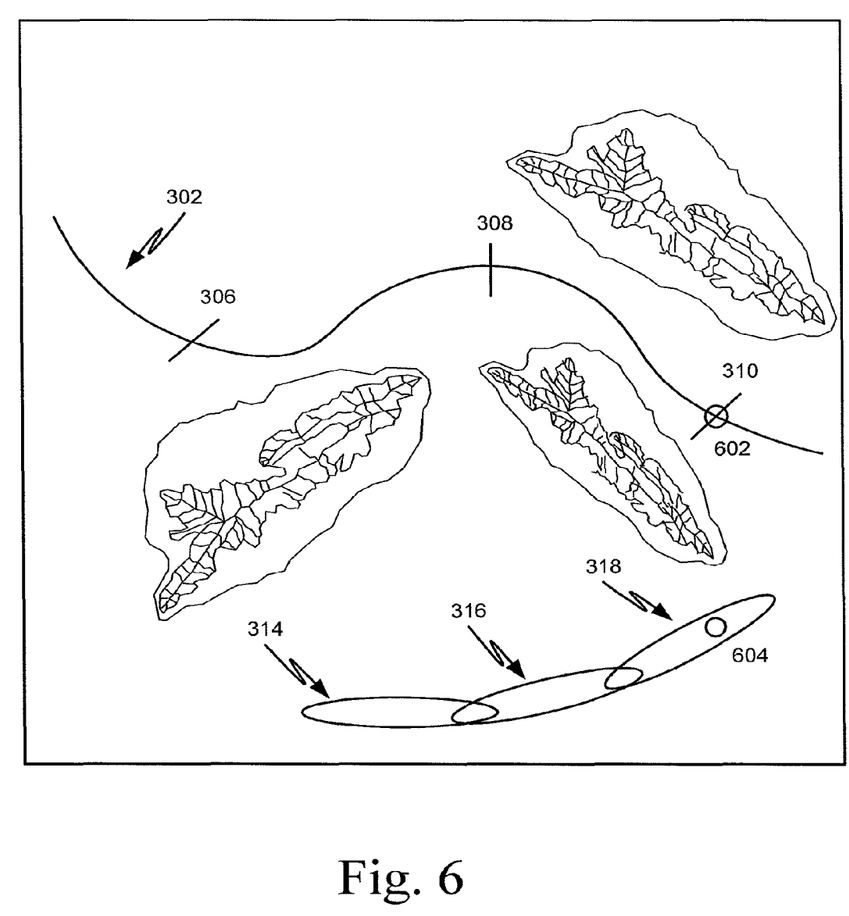
FIG. 6 is a diagram of an exemplary mission at time T3 with no route re-planning needed.

FIG. 6 is a diagram of an exemplary mission at time T3 with no route re-planning needed. At time T3, own forces 602 have moved to location 310 on route 302. Enemy forces 604 have moved within the threshold 318 for time T3.

Figure 7:
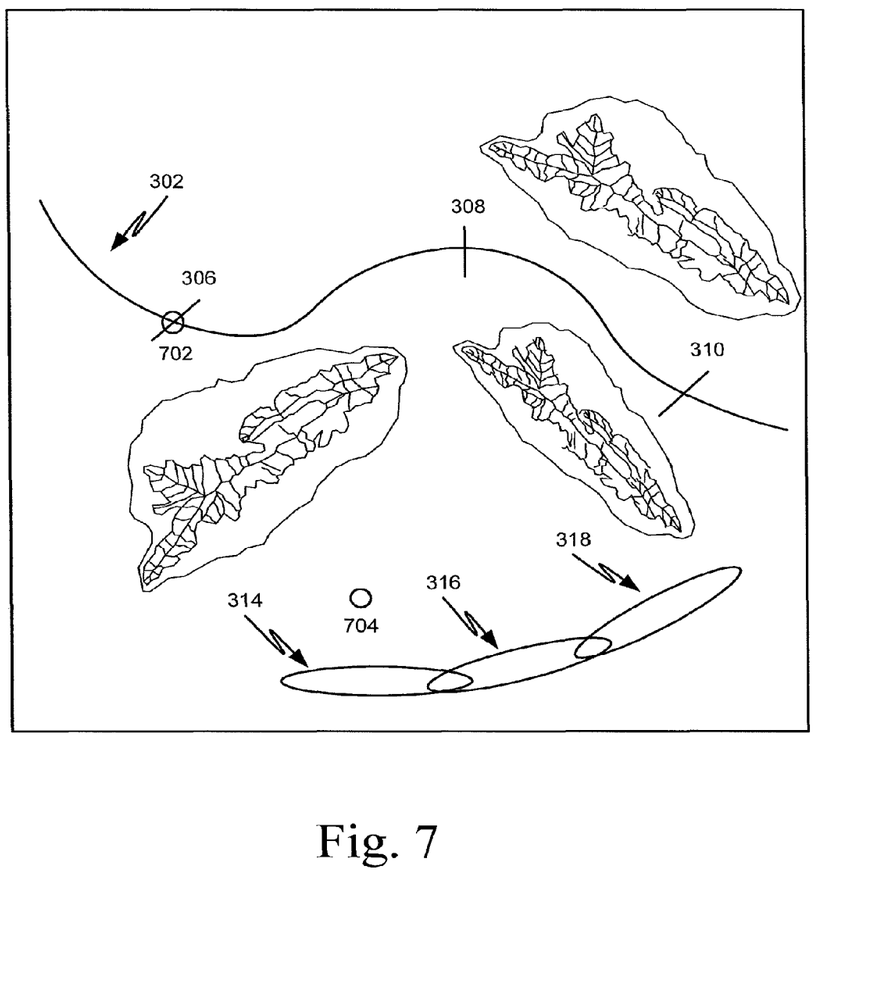
FIG. 7 is a diagram of an exemplary mission at time T1 with a threat at a deviated location.

FIG. 7 is a diagram of an exemplary mission at time T1 with a threat at a deviated location. In particular, own forces 702 have moved to location 302 on the route 302. However, the enemy force 702 has moved to a position outside of the threshold 314 for time T1. As described above, an embodiment can determine when enemy forces have exceeded (or moved outside of) time/space thresholds and therefore a route re-planning may be required.

Figure 8:
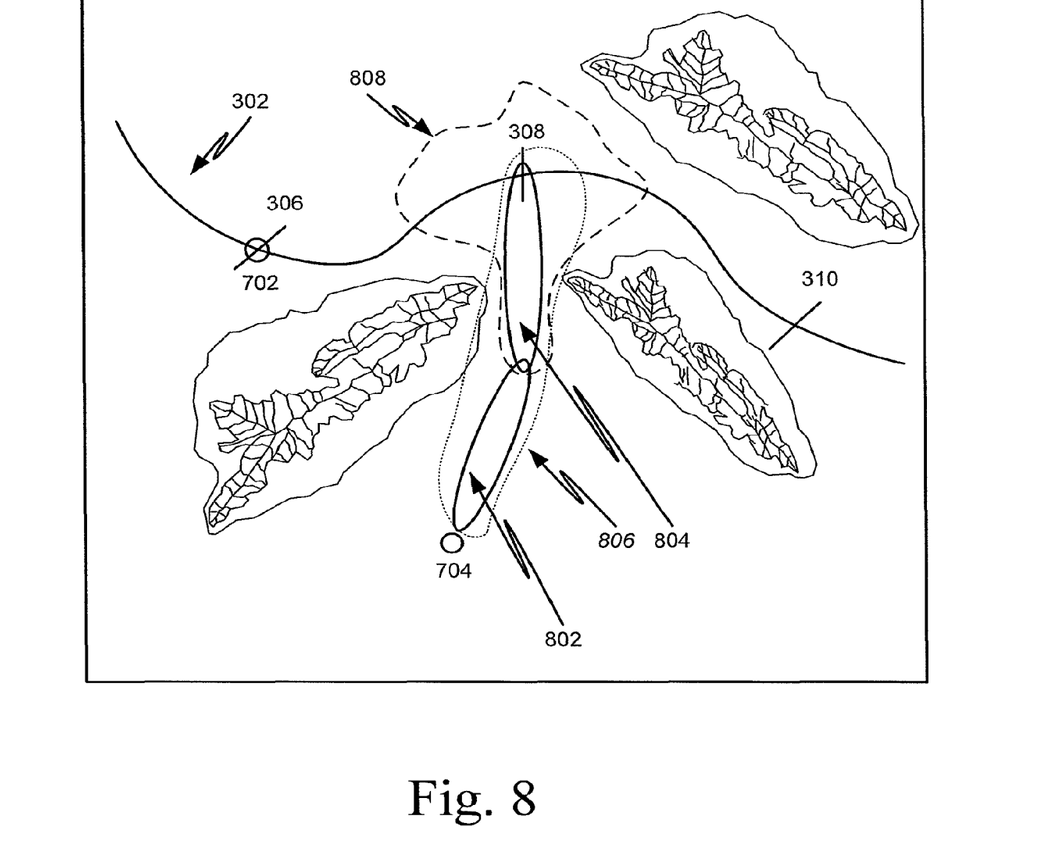
FIG. 8 is a diagram of an exemplary mission at time T1 with new movement predications made for the threat at the deviated location in accordance with the present disclosure.

FIG. 8 is a diagram of an exemplary mission at time T1 with new movement predications made for the threat at the deviated location in accordance with the present disclosure. In particular, new enemy force thresholds have been generated based on the threat position 704 exceeding the original threshold. A new threshold for time T2 (802) and time T3 (804) have been generated. Also, an area of influence for time T2 (806) and time T3 (808) have been determine. The area of influence can be used to determine if the new threat location predictions will place the own forces in imminent danger at the future time points. In the example shown in FIG. 8, the area of enemy threat influence at time T2 (806) extends to the own force location for time T2 (308). Thus, the own forces could potentially be in danger at time T2 and a re-plan is necessary or desirable to reduce the risk of attack on the own forces by the threat.

Figure 9:
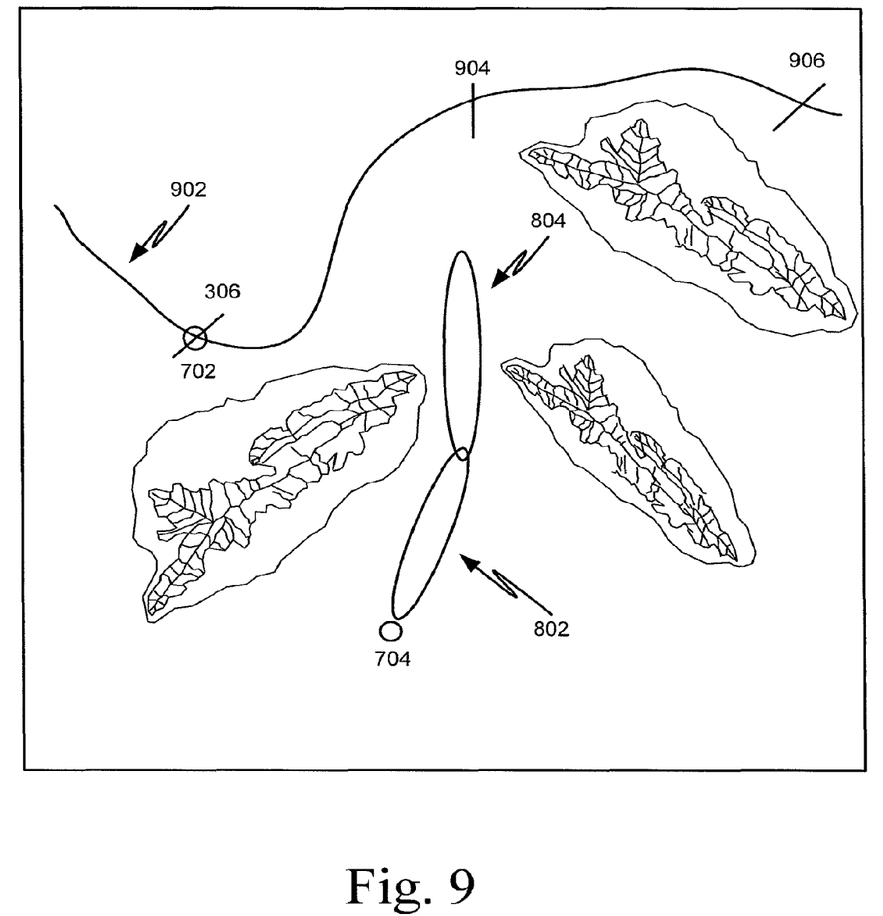
FIG. 9 is a diagram of an exemplary mission at time T1 showing a route re-planned in accordance with the present disclosure.

FIG. 9 is a diagram of an exemplary mission at time T1 showing a route re-planned in accordance with the present disclosure. In particular, a new route 902 has been computed that takes the own forces out of the enemy area of influence for times T2 (904) and T3 (906).

Figure 10:
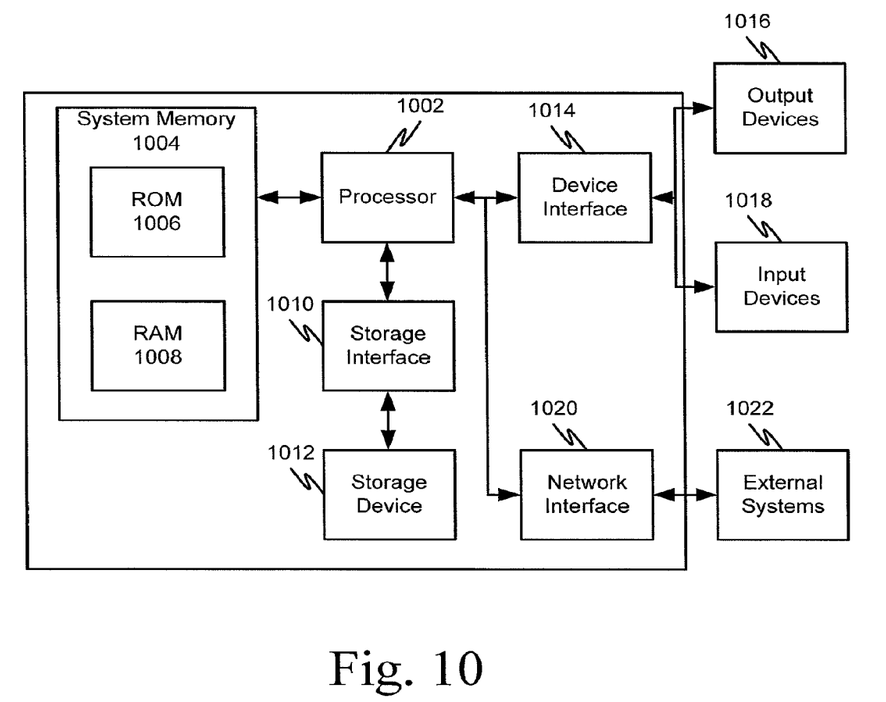
FIG. 10 is a diagram of an exemplary system for route re-planning in accordance with the present disclosure.

FIG. 10 is a diagram of an exemplary system for route re-planning in accordance with the present disclosure. In particular, a computer system 1000 can be employed to implement systems and methods described herein, such as based on computer executable instructions running on the computer system. The computer system 1000 can be implemented on one or more general purpose networked computer systems, embedded computer systems, routers, switches, server devices, client devices, various intermediate devices/nodes and/or standalone computer systems. Additionally, the computer system 1000 can be implemented as part of a mission planning system, vehicle system or avionics system running computer executable instructions to perform a method as described herein.

The computer system 1000 includes a processor 1002 and a system memory 1004. Dual microprocessors and other multi-processor architectures, such as a cloud-based computer, can also be utilized as the processor 1002. The processor 1002 and system memory 1004 can be coupled by any of several types of bus structures, including a memory bus or memory controller, a peripheral bus, and a local bus using any of a variety of bus architectures. The system memory 1004 includes read only memory (ROM) 1006 and random access memory (RAM) 1008. A basic input/output system (BIOS) or other operating system, such as a real-time operating system, can reside in the ROM 1006, generally containing the basic routines that help to transfer information between elements within the computer system 1000, such as at a reset or power-up.

The computer system 1000 can include one or more data storage devices 1012, including a hard disk drive, a magnetic disk drive, (e.g., to read from or write to a removable disk), and an optical disk drive, (e.g., for reading a CD-ROM or DVD disk or to read from or write to other optical media). The data storage devices 1012 can be connected to the processor 1002 by an interface 1010. The data storage devices 1012 provide nonvolatile storage of data, data structures, and computer-executable instructions for the computer system 1000. A number of program modules may also be stored in one of the data storage devices as well as in the RAM 1008, including an operating system, one or more application programs, other program modules, and program data.

A user may enter commands and information into the computer system 1000 through one or more input devices 1016, such as a keyboard or a pointing device (e.g., a mouse). These and other input devices can be connected to the processor 1002 through a device interface 1014. For example, the input devices can be connected to the system bus by one or more a parallel port, a serial port or a universal serial bus (USB). One or more output device(s) 1018, such as a visual display device or printer, can also be connected to the processor 1002 via the device interface 1014.

The computer system 1000 may operate in a networked environment using logical connections (e.g., a local area network (LAN) or wide area network (WAN) to one or more external systems 1022. A given external system 1022 may be a workstation, a computer system, a router, a peer device or other common network node, and typically includes many or all of the elements described relative to the computer system 1000. The computer system 1000 can communicate with the external systems 1022 via a network interface 1020, such as a wired or wireless network interface card or modem. In a networked environment, application programs and program data depicted relative to the computer system 1000, or portions thereof, may be stored in memory associated with the external systems 1022.

Software instructions for the methods described above can be stored in a nontransitory computer readable medium such as RAM, ROM, EEPROM, flash memory, CD, DVD, magnetic disc drive, optical disc drive, electronic memory and/or any now known or later developed computer readable medium suitable for storing instructions and/or data.

The processor 1002 can include a microprocessor, microcontroller, digital signal processor, application specific integrated circuit, programmable logic device and/or the like.

The network and/or links between the computer system 1000 and the external systems 1022 can each include one or more of a local area network, a wide area network, the Internet, a virtual private network, a wireless network (WiFi, cellular, Bluetooth or the like), a wired network or the like.

The system 1000 can be a system tailored and configured for a specific application such as an avionics system for an airplane, helicopter or unmanned aerial vehicle. Also, the system 1000 can be tailored for use in a ground vehicle such as a truck.

It will be appreciated that the modules, processes, systems, and sections described above can be implemented in hardware, hardware programmed by software, software instructions stored on a nontransitory computer readable medium or a combination of the above. A system for route re-planning using enemy force lethality projection, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and mission planning and simulation arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and computer readable media for route re-planning using enemy force lethality projection.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A computerized method for route re-planning, the method comprising:
  receiving, at a processor programmed to perform route re-planning, an electronic message including an original mission plan for a vehicle and location data for a plurality of threats, the mission plan including an original route for the vehicle;
  comparing threat location data for a threat to a stored time/space threat threshold corresponding to the threat, the stored time/space threshold including a threshold geographical area boundary, and determining, based on the comparison, whether a moving threat location has moved outside or moved within the threshold geographical area boundary;
  when a threat location has moved within the threshold geographical area boundary, the original mission plan including the original route for the vehicle is maintained;
  when the threat location has moved outside the corresponding threshold geographical area boundary, performing steps including:
    assessing, with the processor, own force survivability and generating a reflexive response signal when own force is in immediate danger and providing a warning display within the vehicle in response to the reflexive response signal;
    generating, with the processor, new threat movement predictions;
    performing an updated multi-point survivability analysis with the processor using the new threat movement predictions as input;
    determining, with the processor, whether a current mission plan is survivable based on the updated multi-point survivability analysis; and
    when the current mission plan is not survivable, generating a new mission plan including a re-planned route, wherein the threat location data is obtained from a common operational picture database or a sensor system.

2. The method of claim 1, wherein the mission plan is generated by the processor according to a series of operations performed by the processor, the operations including:
  predicting initial threat movements;
  performing a multi-point survivability analysis; and
  generating an initial mission plan including a route.

3. The method of claim 2, wherein the multi-point survivability analysis and the updated multi-point survivability analysis include determining the lethality of a threat at a plurality of locations.

4. The method of claim 2, wherein performing the multi-point survivability analysis and the survivability analysis includes generating time/space thresholds for each threat at each of a plurality of predetermined times in a mission timeline.

5. The method of claim 1, wherein receiving the threat location data includes receiving data from a sensor.

6. A non-transitory computer-readable medium having software instructions stored thereon that, when executed by a processor, cause the processor to perform operations comprising:
  maintaining a current mission plan including a current route for a vehicle when a threat location has moved within a corresponding time/space threat threshold, the time/space threat threshold including a threshold geographical area boundary; and
  when the threat location has moved outside the corresponding threshold geographical area boundary, performing steps including:
    generating, with the processor, new threat movement predictions;
    performing an updated multi-point survivability analysis with the processor using the new threat movement predictions as input;
    determining, with the processor, whether the current mission plan is survivable based on the updated multi-point survivability analysis; and
    when the current mission plan is not survivable, generating a new mission plan including a re-planned mission route, wherein the threat location data is obtained from a common operational picture database or a sensor system.

7. The non-transitory computer-readable medium of claim 6, wherein the operations further comprise:
  assessing, with the processor, own force survivability and generating a reflexive response signal when own force is in immediate danger.

8. The non-transitory computer-readable medium of claim 6, wherein the mission plan is generated by the processor according to a series of operations performed by the processor, the operations including:
  predicting initial threat movements;
  performing a multi-point survivability analysis; and
  generating a mission route.

9. The non-transitory computer-readable medium of claim 8, wherein the multi-point survivability analysis and the updated multi-point survivability analysis include determining the lethality of a threat at a plurality of locations.

10. The non-transitory computer-readable medium of claim 6, further comprising receiving threat location data from a sensor.

11. The non-transitory computer-readable medium of claim 6, further comprising receiving threat location data from a common operational picture database.

12. A computerized method for route re-planning, the method comprising:
  comparing, by a processor programmed to perform route re-planning, threat location data for a threat to a stored time/space threat threshold corresponding to the threat, the stored time/space threshold including a threshold geographical area boundary, and determining, based on the comparison, whether a moving threat location has moved outside or moved within the threshold geographical area boundary;
  maintaining a current mission plan including a current mission route for the vehicle when a threat location has moved within a corresponding time/space threat threshold; and
  when the threat location has moved outside the corresponding time/space threat threshold, assessing the impact of the threat moving outside the corresponding time/space threat threshold, wherein the threat location data is obtained from a common operational picture database or a sensor system.

13. The computerized method of claim 12, wherein the assessing the impact of the threat moving outside the corresponding time/space threat threshold comprises:
  assessing survivability of the current mission plan; and
  when the current mission plan is not survivable, generating a new mission plan including a re-planned mission route.

14. The computerized method of claim 12, wherein the assessing the impact of the threat moving outside the corresponding time/space threat threshold comprises:
- generating, with the processor, new threat movement predictions;
- performing an updated multi-point survivability analysis with the processor using the new threat movement predictions as input;
- determining, with the processor, whether the current mission plan is survivable based on the updated multi-point survivability analysis; and
- when the current mission plan is not survivable, generating a new mission plan including a re-planned mission route.

* * * * *

UNITED STATES PATENT AND TRADEMARK OFFICE
CERTIFICATE OF CORRECTION

PATENT NO. : 8,812,229 B2
APPLICATION NO. : 14/048176
DATED : August 19, 2014
INVENTOR(S) : James C. Rosswog et al.

Page 1 of 1

It is certified that error appears in the above-identified patent and that said Letters Patent is hereby corrected as shown below:

In The Specification in column 3, line 43, "T0 (306)" should read --T1 (306)--, and
"T1 (308)" should read --T2 (308)--, in column 3, line 60, "location 302" should read --location 306--, in column 3, line 61, "enemy force 702" should read --enemy force 704--, in column 4, line 63, "input devices 1016," should read --input devices 1018,--, in column 4, line 67, "one or more a" should read --one or more of a--, and in column 5, line 2, "output device(s) 1018," should read --output device(s) 1016,--.

Signed and Sealed this
Sixteenth Day of August, 2016

Michelle K. Lee
*Director of the United States Patent and Trademark Office*